May 6, 1958  V. WEBER ET AL  2,833,894
TEMPERATURE RESPONSIVE CONTROL
Original Filed Sept. 8, 1954  4 Sheets-Sheet 1

INVENTORS
Victor Weber, Hugh J. Tyler
and William J. Russell.
BY
THEIR ATTORNEY

May 6, 1958 V. WEBER ET AL 2,833,894
TEMPERATURE RESPONSIVE CONTROL
Original Filed Sept. 8, 1954 4 Sheets-Sheet 2

INVENTORS
Victor Weber, Hugh J. Tyler
and William J. Russell.
BY
THEIR ATTORNEY

United States Patent Office 2,833,894
Patented May 6, 1958

2,833,894
TEMPERATURE RESPONSIVE CONTROL

Victor Weber, Greensburg, Hugh J. Tyler, Pittsburgh, and William J. Russell, Jeannette, Pa., assignors to Robertshaw-Fulton Controls Company, Greensburg, Pa., a corporation of Delaware Original application September 8, 1954, Serial No. 454,753. Divided and this application December 12, 1956, Serial No. 627,908

7 Claims. (Cl. 200—140)

This application is a division of our application Serial No. 454,753, filed September 8, 1954. This invention relates to thermostatic control devices and more particularly to an improved device which is particularly adapted for controlling a surface heating element of an electric range.

Many foods require rapid initial heating to bring the food to a predetermined temperature and thereafter require a reduced amount of heat input to maintain such predetermined temperature. It is an object of this invention to effect such a cooking operation by permitting the heating element to operate at full energy input until the temperature of the food to be cooked reaches a predetermined value, and then reducing the energy input to the heating element to maintain the food at the proper temperature.

Another object of this invention is to incorporate in a thermostatic control device a switching mechanism for reducing the energy input to a heating element as the control temperature is approached during an increase in temperature.

Another object of the invention is to open a first pair of contacts of a thermostatically operated switch at a first temperature condition and a second pair of contacts at a second temperature condition.

Another object of this invention is to enable manual selection of portions of a heating element to obtain different heating rates at different cooking temperatures.

In one embodiment of the invention, switching mechanism is provided for periodically making and breaking the circuit to the heating element and a thermostatically operated switch controls a shunt circuit which, when closed, supplies uninterrupted power to the heating element. Opening of the thermostatically controlled switch at a predetermined temperature of the cooking vessel places the supply of power to the heating element under the control of the periodic cycling mechanism. The amount of energy supplied to the heating element will then be determined by the length of the "on" period in each cycle. An additional thermostatic switch is provided for disconnecting the heater from the power source upon an excessive temperature rise at the cooking vessel. The temperature responsive means is adjustable to effect switching from the continuous energization arrangement to period energization arrangement and to complete deenergization at selected temperatures.

Other objects and advantages will become apparent from the following description taken in connection with the accompanying drawings wherein.

Figure 1:
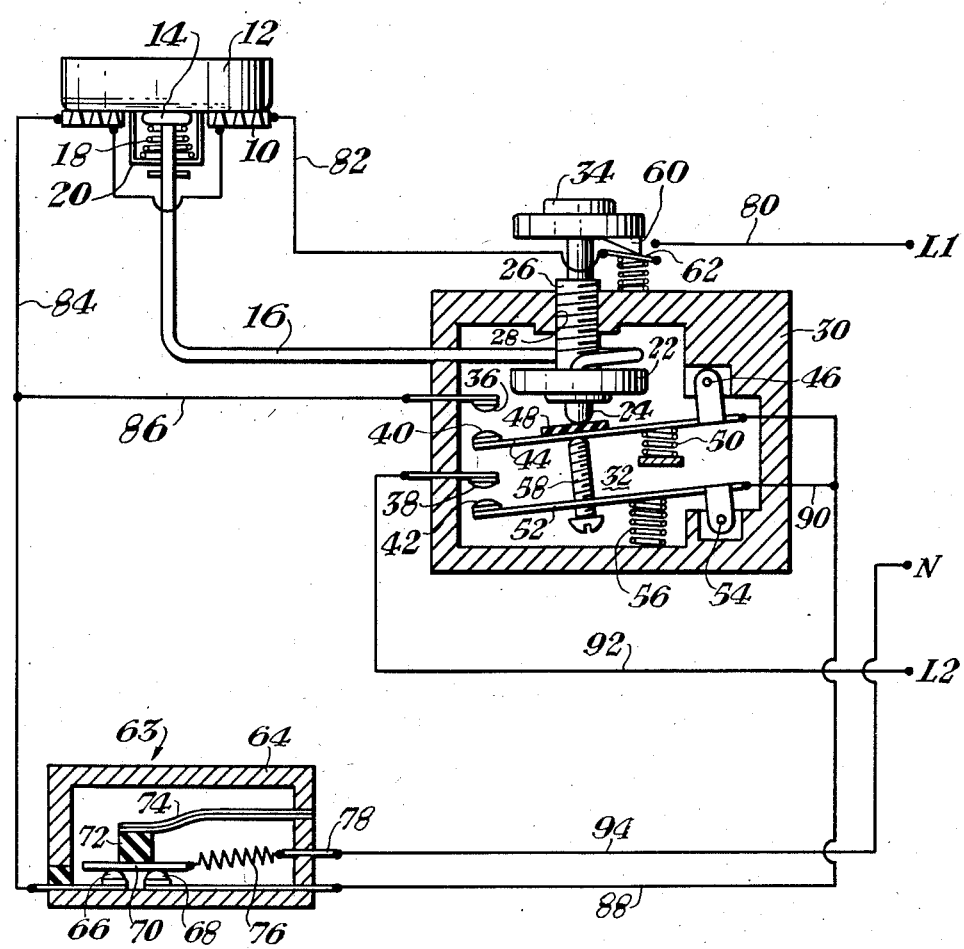
Fig. 1 is a schematic view of a surface heater of an electric range and a control device embodying this invention.

Referring more particularly to Fig. 1 of the drawings, there is shown an annular surface heating element 10 which is adapted to be supported on the top plate of an electric range (not shown) in a manner well known in the art. The heating element 10 is adapted to support a cooking vessel 12 thereon and is provided with a temperature sensing bulb 14 which is located centrally thereof.

The bulb 14 takes the form of a flat hollow container which communicates with a capillary tube 16 and is biased toward the cooking vessel 12 by a spring 18 seated on a suitable stirrup 20. The particular structure of the bulb 14 and mounting therefor is fully disclosed and claimed in our co-pending application Serial No. 454,754, filed September 8, 1954, which is now Patent No. 2,786,930.

The capillary tube 16 also communicates with an expansible power element 22 which may consist of a pair of flexible diaphragms welded together at their periphery and carrying a thrust button 24 on one side thereof. The other side of the power element 22 is secured to a stud 26 which is threaded through a suitable aperture 28 formed in a wall of a casing 30 to mount the power element 22 within a chamber 32 formed in the casing 30.

One end of the stud 26 projects out of the casing 30 and carries a manually operable knob or dial 34 which may be manipulated to rotate the stud 26 and thus effect axial adjustment of the power element 22 relative to the casing 30.

The assembly of the bulb 14, capillary tube 16, and expansible power element 22 is filled with a suitable thermal fluid which will expand upon increase in temperature sensed by the bulb 14 to effect expansion of the power element 22.

Disposed within the chamber 32 is a pair of spaced superposed fixed contacts 36, 38 which are engageable respectively by a pair of movable contacts 40, 42. The movable contact 40 is carried on the free end of a switch arm 44 which is pivoted at its other end 46 on the casing 30. The switch arm 44 underlies the thrust button 24 of the power element 22 and carries a block of insulating material 48 which is engageable by the button 24. A spring 50 acts between the arm 44 and the casing 30 to bias the switch arm 44 in a clockwise direction, as viewed in the drawing, and thus bias the movable contact 40 toward the stationary contact 36.

The movable contact 42 is carried on one end of a switch arm 52 which underlies the switch arm 44 and is pivoted at its other end 54 on the casing 30. A spring 56 acting between the casing 30 and the switch arm 52 serves to bias the latter in a clockwise direction and thus bias the movable contact 42 toward the stationary contact 38.

Abutment means is provided for transmitting movement from the switch arm 44 to the switch arm 52 for a purpose which will more fully appear hereinafter. This means takes the form of a screw 58 threaded through the switch arm 52 and extending toward the switch arm 44 to be engageable by the block 48 carried by the switch arm 44.

The dial 34 is provided with suitable cam means 60 which coact with a normally closed switch 62 to open the same in a selected position of the dial 34 and thereby establish an "off" position for the control.

The range embodying this invention also includes cyclic switch means indicated generally by the reference numeral 63 and including means for periodically making and breaking a control circuit. The cyclic switch means 63 is here shown as comprising a hollow casing 64 having a pair of fixed contacts 66, 68 mounted therein. The fixed contacts 66, 68 are positioned to be connected by a contact bridge 70 carried on a block of insulating material 72 which is secured to one end of a bimetallic strip 74. The other end of the bimetallic strip 74 is securely anchored to the casing 64. The bimetal strip 74 is positioned in the casing 64 to hold the contact bar 70 in engagement with the contacts 66, 68 when it is in its unheated condition. However, heating of the bimetal strip 74 will cause the same to flex and move the contact bar 70 out of engagement with the contacts 66, 68.

Means are provided for alternately heating and cooling the bimetal strip 74. This means is here shown as a heating coil 76 positioned within the casing 64 beneath the bimetal strip 74 and connected at one end to the contact bridge 70. The other end of the heater 76 is connected to a suitable terminal 78 which extends out of the casing 64.

The electrical connections between the various parts of the control system will be brought out in a description of the operation of the apparatus which now follows.

As shown, the apparatus is in the "off" position with no electrical energy being supplied to the surface heating element 10 or the heating coil 76. To place the apparatus in operation, the dial 34 is rotated to a desired temperature setting. Such rotation of the dial 34 will move the cam means 60 out of engagement with the switch 62 and permit the latter to close. The temperature setting movement of the dial 34 will also serve to screw the stud 26 out of the casing 30 and move the power element 22 upward, thereby permitting the movable contacts 40, 42 to move into engagement with the fixed contacts 36, 38 respectively.

The apparatus is thus conditioned to supply a steady flow of electrical energy to the surface heating element 10 through a circuit which may be traced as follows: line wire L1 of a suitable three-wire power source, wire 80, switch 62, wire 82, heating element 10, wire 84, wire 86, contacts 36, 40, switch arm 44, wire 88, wire 90, switch arm 52, contacts 42, 38 and wire 92 to line wire L2.

When power is so supplied to the heating element 10, heat will be generated thereby to raise the temperature of the cooking vessel 12 and the food contained therein.

At this point, a circuit is also completed through the heating coil 76 of the cyclic switch means 63. This circuit may be traced as follows: line wire L2, wire 92, contacts 38, 42, switch arm 52, wire 90, wire 88, contact 68, contact bridge 70, heating coil 76, terminal 78, and wire 94 to neutral wire N of the three-wire power source. Thus a voltage is impressed across the heating coil 76 causing current to flow therein and raise the temperature thereof. The temperature increase of the heating coil 76 causes the bimetal strip 74 to become heated and to flex thereby moving the contact bridge 70 out of engagement with the contact 68 and breaking the above traced energizing circuit for the heating coil 76. The heating coil 76 will then cool and permit the bimetal strip 74 to cool and return the contact bar 70 into engagement with the contacts 66, 68. Movement of the contact bar into engagement with the contact 68 again completes the energizing circuit for the heating coil 76 and the cycle of the cyclic switch means 63 is repeated.

When the contact bar 70 of the cyclic switch means 63 is in engagement with the fixed contacts 66, 68, it also serves to complete an energizing circuit for the surface heating element 10 which may be traced as follows: line wire L1, wire 80, switch 62, wire 82, surface heating element 10, wire 84, contact 66, contact bridge 70, contact 68, wire 88, wire 90, switch arm 52, contacts 38, 42 and wire 92 to line wire L2.

It will be apparent that the above traced energizing circuits for the top heater 10 locate the switch 36, 40, 44 in parallel circuit with the cyclic switch 66, 68, 70 so that the former effectively shunts the latter when it is in its closed position with the contacts 36, 40 in engagement with each other. Thus, as long as the contacts 36, 40 are in engagement with each other, the cycling operation of the cyclic switch means 63 will not affect the steady energization of the surface heating element 10.

As the temperature of the cooking vessel 12 rises, the temperature of the bulb 14 will increase to cause expansion of the power element 22. Expansion of the power element 22 will move the thrust button 24 into engagement with the block 48 to swing the switch arm 44 in a counterclockwise direction against the bias of the spring 50 and thereby move the contact 40 out of engagement with the fixed contact 36.

Opening of the contacts 36, 40 will break the circuit which shunts the cyclic switch 66, 68, 70 so that current through the surface heater 10 must flow through the switch 66, 68, 70. At this stage of the operation, the contact bridge 70 is moving periodically into and out of engagement with the contacts 66, 68 by the bimetal strip 74 and the heating coil 76. Accordingly, power is supplied to the surface heating element 10 intermittently and the total amount of electrical energy supplied to the surface heating element 10 will be determined by the cycling characteristics of the switch means 63. It has been found that excellent results are obtained if the cyclic switch means 63 is constructed to close the energizing circuit for the surface heater 10 for approximately ten seconds and maintain this circuit open for twenty seconds during a thirty second cycle of the switch means 63. It will be understood, however, that other proportions of "on" and "off" time may be used.

When the switch 36, 40 is open and power is being supplied to the surface heating element 10 under the control of the cyclic switch means 63, the average rate of energy input to the heating element 10 is substantially less than the steady input which occurs when the switch 36, 40 is closed. Thus, the heat produced by the heating element 10 and transmitted to the cooking vessel 12 is also reduced. Heat supplied to the cooking vessel 12 at this reduced rate continues to raise the temperature of the food therein, bringing it up to the desired temperature gradually.

It will be apparent that, since the thermal fluid within the bulb 14 is separated from the vessel 12 by layers of metal and air, the temperature thereof will necessarily lag behind the temperature of the vessel as the latter rises. However, when heat is being supplied to the vessel at a relatively low rate, the degree at which the temperature of the thermal fluid lags the temperature of the food will be substantially less than when heat is being supplied to the vessel 12 at a relatively high rate. Accordingly, reduction of the rate of heat input to the vessel 12 as the same approaches the desired temperature, will reduce the possibility of "overshooting" and consequent burning of the contents of the vessel 12.

As the temperature of the vessel 12 rises as a result of the intermittent energy input to the heating element 10 under the control of the cyclic switch means 63, the temperature rise is sensed by the bulb 14 and the power element 22 continues to expand. The continued expansion of the power element 22 moves the block 48 into engagement with the screw 58 carried on the switch arm 52. Further expansion of the power element 22 imparts movement to the screw 58 to move the switch arm 52 against the bias of the spring 56 and separate contacts 42, 38.

Opening of the contacts 38, 42 will break the intermittent energizing circuit for the heating element 10 to further reduce the supply of heat to the vessel 12.

It is to be noted that after the steady and intermittent energizing circuits for the heating element 10 are broken, the heating coil 76 is energized from L1, wire 80, switch 62, wire 82, heater 10, wire 84, contact 66, contact bar 70, heater 76, and wire 94 to neutral wire N. Thus, the cyclic switch means 63 continues to cycle and is conditioned to take over the control of the energization of the heating element 10 at any time. This is particularly important since initiation of cycling in the cyclic switch means 63 may produce an initial cycle on the order of one or two minutes resulting from the necessity of bringing the bimetallic strip 74 and heating coil 76 to their operating temperatures. Preferably, the resistance of the heating coil 76 is relatively high to hold the current flowing in the last traced circuit to a minimum.

As the temperature of the vessel 12, as sensed by the bulb 14, drops, the power element 22 will contract to permit the switch arms 44, 52 to move upward under the bias of the springs 50, 56. This movement of the switch arms 44, 52 will move the contact 42 into engagement with the contact 38 to once again complete the intermittent energizing circuit for the heating element 10 and restore the relatively low rate of heat supply to the vessel 12. Usually, the restoration of the reduced rate of heat input will serve to restore the desired temperature to the vessel 12 to again cause expansion of the power element 22 and opening of the contacts 38, 42. However, in the event that the reduced heat input is not sufficient to restore the desired temperature, the power element 22 may contract sufficiently to close the contacts 36, 40 thereby completing the circuit which shunts the cyclic switch means 63 and provides a continuous supply of electric energy to the heating element 10.

It will be apparent from the foregoing that the apparatus shown in Fig. 1 is operative to bring the temperature of a cooking vessel rapidly up to a temperature approaching the desired control temperature by supplying power continuously to the heating element 10 and thereafter effecting a gradual temperature rise of the cooking vessel 12 to the selected cooking temperature by supplying power intermittently to the heating element 10; subsequent maintenance of the selected temperature of the cooking vessel 12 being effected by supplying intermittent or continuous power to the heating element 10 in response to temperature variations of the cooking vessel 12. The temperature at which the power supply to the heating element 10 is switched from continuous to intermittent is accurately determined with respect to the desired temperature of the cooking vessel 12, as selected by the setting of the dial 34, by means of the screw 58 carried on the switch arm 52. The screw 58 may be threaded into the switch arm 52 to adjust the differential between the temperatures at which the switch arms 44, 52 will open their respective contacts. Thus, the screw 58 effectively adjusts the temperature span in which the cyclic switch means 63 will control the cooking operation.

Figure 2:
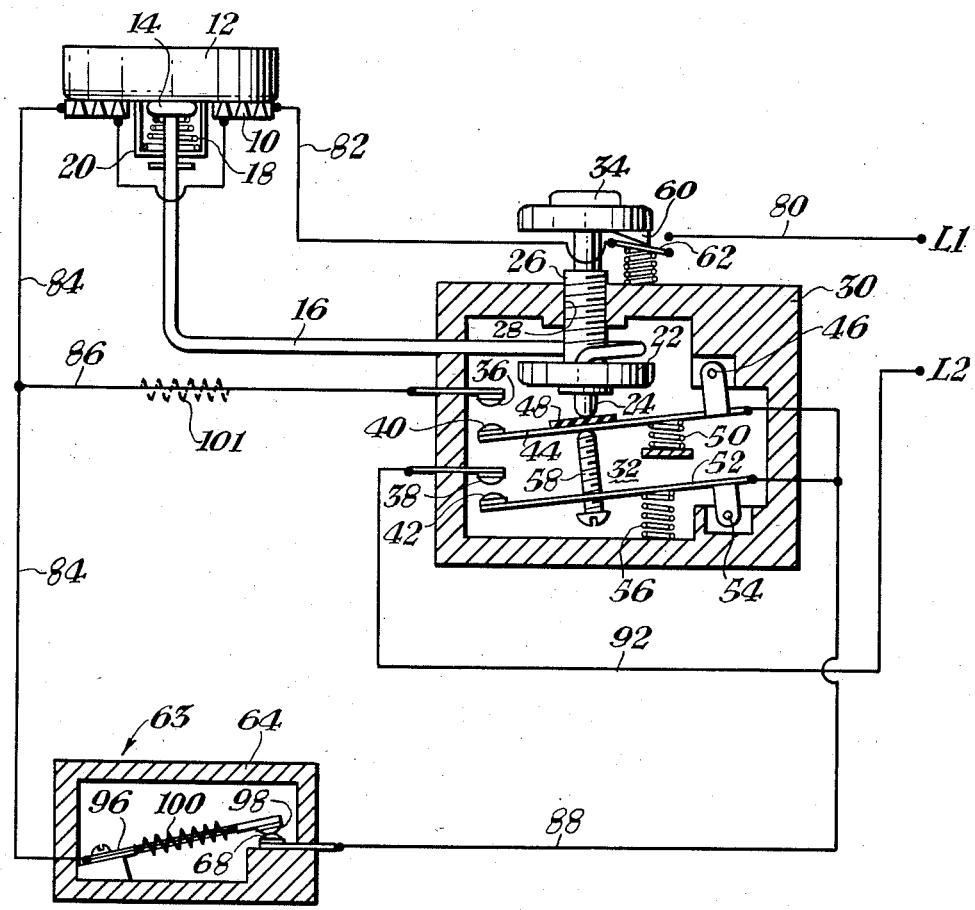
Fig. 2 is a view similar to Fig. 1 but showing a modified form of the invention.

Another embodiment of the invention is shown in Fig. 2, wherein parts corresponding to parts hereinbefore described are given like reference numerals. This embodiment is similar to the embodiment shown in Fig. 1 but differs therefrom in the form and electrical hookup of the cyclic switch means.

The cyclic switch means 63 of Fig. 2 comprises a casing 64 having a fixed contact 68 mounted therein. A bimetallic switch arm 96 is secured at one end to the casing 64 and carries on its other end a movable contact 98 which is engageable with the fixed contact 68. A heating coil 100 encircles the bimetallic switch arm 96 and is connected at one end to the movable contact 98. The other end of the heating coil 100 is connected to the wire 84 which in turn is connected to the surface heating element 10 and to the fixed contact 36 of the thermostatic switch.

In the normal or unheated condition of the bimetallic switch arm 96, the contact 98 is in engagement with the fixed contact 68 so that the heating coil 100 is connected in series with the surface heating element 10 and in parallel with the thermostatic switch 36, 40.

When the contact 98 is in engagement with contact 68, and the contacts 38, 42 of the thermostatic switch are closed, an energizing circuit for the heating coil 100 is completed and may be traced as follows: line wire L1, wire 80, switch 62, wire 82, surface heating element 10, wire 84, heating coil 100, contacts 98, 68, wire 88, switch arm 52, contacts 42, 38, and wire 92 to line wire L2.

Energization of the heating coil 100 results in heating of the bimetallic switch arm 96 and warping of the same to move the contact 98 out of engagement with the contact 68. Opening of the contacts 98, 68 breaks the energizing circuit for the heating coil 100 and permits the bimetallic switch arm 96 to cool and return the contact 98 into engagement with the fixed contact 68. Closing of the contacts 98, 68 will again complete the energizing circuit for the heating coil 100 and the operating cycle of the switch means 63 will be repeated. Thus, the cyclic switch means 63 will continue to make and break as long as it is connected to the source.

If desired, there may be inserted in the wire 86 a resistance 101 (shown in broken lines in Fig. 2) of sufficient ohmic value relative to the resistance of the coil 100 to cause the coil 100 to draw enough current to effect the above described cycling operation even when the contacts 36, 40 of the thermostatic switch are closed to establish a shunt circuit across the heating coil 100. When the resistance 101 is so used, cycling of the switch means 63 will begin immediately upon movement of the dial 34 to a selected temperature setting to effect closing of the switches 60, 36, 40, and 38, 42. Thus, the cyclic switch means 63 will be conditioned to take over control of the supply of electric energy to the surface heater 10 immediately upon opening of the thermostatic switch contacts 36, 48.

Operation of the apparatus shown in Fig. 2 is similar to the operation of that shown in Fig. 1, differing only in that the energizing circuit for the heating coil of the cyclic switch means 63 is broken when the power element 22 expands sufficiently to open the contacts 38, 42.

Figure 3:
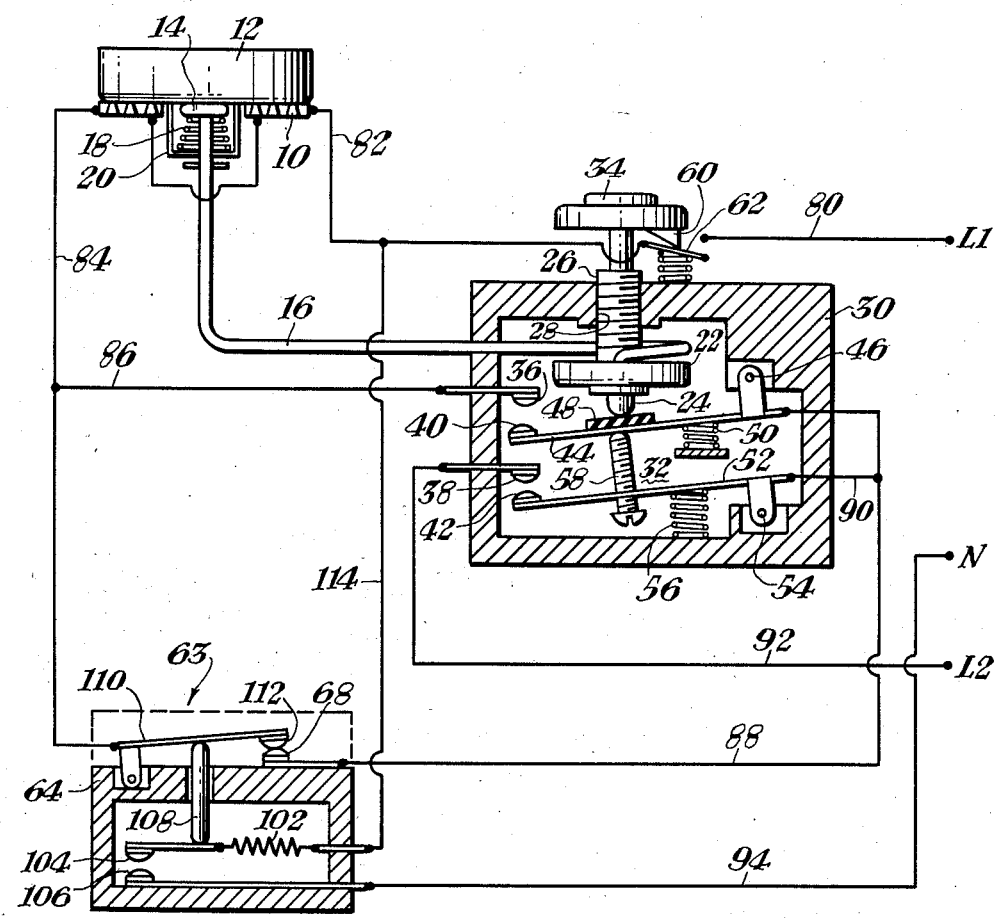
Fig. 3 is a view similar to Fig. 1 but showing another modified form of the invention.

Another embodiment of the invention is illustrated in Fig. 3, wherein parts corresponding to parts hereinbefore described are designated by like reference numerals. This embodiment is similar to the embodiment illustrated in Fig. 1 but differs therefrom in the form and electrical hookup of the cyclic switch means.

The cyclic switch means 63 of Fig. 3 comprises a casing 64 having a fixed contact 68 mounted thereon. A bimetallic resistance element 102 is secured at one end to the casing 64 and carries on its other end a movable contact 104 which is engageable with a second fixed contact 106. A pin 108 slidably mounted in the casing 64 extends between the bimetallic resistance element 102 and a movable switch arm 110. The switch arm 110 carries a contact 112 which is engageable with the fixed contact 68. The switch arm 110 is connected to the wire 84 and the fixed contact 68 is connected to the wire 88 so that the contacts 112, 68 control intermittent energization of the surface heater 10.

To effect periodic opening and closing of the contacts 112, 68, the bimetallic resistance element 102 is connected to the wire 82 by a wire 114 and the fixed contact 106 is connected to the wire 94 which in turn is connected to the neutral wire N of the power source.

In the normal or unheated condition of the bimetallic resistance element 102, the contact 104 is in engagement with the fixed contact 106 so that the bimetallic resistance element 102 is connected directly between line wire L1 and neutral wire N by a circuit which may be traced as follows: line wire L1, wire 80, switch 62, wire 82, wire 114, bimetallic resistance element 102, contacts 104, 106, and wire 94 to neutral wire N.

Completion of the last traced circuit permits current to flow through the bimetallic resistance element 102 to cause heating of the same. Such heating will cause the bimetallic resistance element 102 to warp and move the contact 104 out of engagement with the contact 106 thus breaking the energizing circuit for the bimetallic resistance element and permitting the same to cool. Cooling of the bimetallic resistance element 102 will cause the same to return to its initial position and move the contact 104 into engagement with the contact 106. Closing of the contacts 104, 106 will again complete the energizing circuit for the bimetallic resistance element 102 and the operating cycle of the switch means 63 will be repeated. Thus, the cyclic switch means 63 will continue to make and break as long as the switch 62 is closed.

The pin 108 establishes a mechanical connection between the bimetallic resistance element 102 and the switch arm 110 so that making and breaking of the contacts 104 with associated movement of the bimetallic resistance element 102 will cause corresponding making and breaking of the contacts 112, 68 in the energizing circuit for the surface heater 10.

Operation of the apparatus shown in Fig. 3 is similar to the operation of that shown in Fig. 1, differing only in that the energizing circuit for the bimetallic resistance element is connected directly across the source at all times and current flowing therein is at no time required to flow through the surface heater 10.

Figure 4:
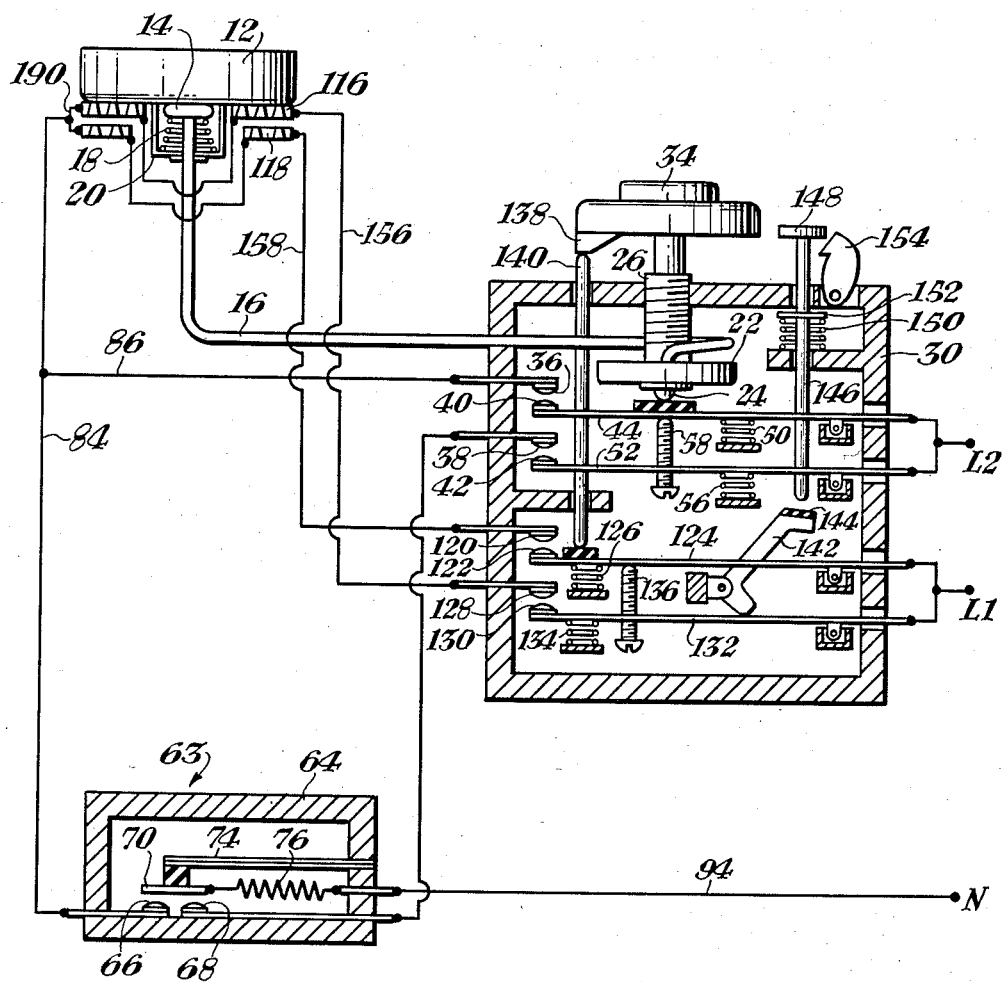
Fig. 4 is a view similar to Fig. 1 but showing another modified form of the invention.

Another embodiment of the invention as illustrated in Fig. 4 wherein parts corresponding to parts hereinbefore described are designated by corresponding reference numerals. This embodiment is similar to the embodiment shown in Fig. 1 but differs therefrom in the form of the surface heater and also in the form of the manually operable switch which connects the surface heater directly to the power source.

The surface heater of Fig. 4 takes the form of two heating elements 116, 118 connected in parallel between the wire 84 and the line wire L1 of the three-wire power source. Connected in series with the heating element 118 is a first manually operable switch means comprising a fixed contact 120 and a movable contact 122 which is carried on the switch arm 124. The switch arm 124 is pivoted in the casing 30 and is connected to the line wire L1. A spring 126 acting between the switch arm 124 and the casing 30 biases the switch arm 124 in a direction to normally hold the contact 122 in engagement with the contact 120.

Connected in series with the heating element 116 is manually operable switch means comprising a fixed contact 128 mounted on the casing 30 to be engageable by a movable contact 130. The contact 130 is carried on a switch arm 132 pivoted on the casing 30 beneath the switch arm 124. The switch arm 132 is connected to the line wire L1 and is biased by a spring 134 to normally hold the contact 130 in engagement with the contact 128. A screw 136 is threaded through the switch arm 132 and abuts the switch arm 124 for a purpose which will more fully appear hereinafter.

Manually operable means is provided for moving the contacts 122, 130 out of engagement with the contacts 120, 128, respectively when the dial 34 is moved to a predetermined position to provide an "off" position for the control wherein the heating elements 116, 118 will be disconnected from the power source. To this end, a cam 138 is formed on the underside of the dial 34 to be engageable with one end of a push rod 140. The push rod 140 is slidably mounted in the casing 30 and the other end thereof extends into engagement with the switch arm 124. The push rod 140 is of sufficient length to hold the contact 122 out of engagement with the contact 120 when the outer end of the rod 140 is in engagement with the cam 138. Rotation of the dial 34 to move the cam 138 out of engagement with the push rod 140 will permit the switch arm 124 to move under the bias of the spring 126 to position the contact 122 in engagement with the contact 120. Since the screw 136 carried by the switch arm 132 abuts the switch arm 124, the switch arm 132 will follow the movements of the switch arm 124 so that the cam 138 and push rod 140 also serve to operate the contacts 128, 130.

Operation of the apparatus in Fig. 4 thus far described is similar to the operation of that shown in Fig. 1 with the contacts 120, 122, 128, 130 performing the same function as the switch 62 of Fig. 1 and the parallel connected heating element 116, 118 operating in the same manner as the surface heater 10 of Fig. 1. However, if a relatively small mass of food is to be cooked in the vessel 12, it may be desirable to utilize only one of the heating elements 116, 118. Accordingly, manually operable means are provided for latching the contacts 128, 130 in open position to disconnect the heating element 116 from the power source.

This means takes the form of a bell crank lever 142 pivoted in the casing 30 with one leg thereof extending into engagement with the switch arm 132. The other leg of the bell crank lever 142 extends upward and is provided with a suitable seating surface 144 which is engageable by a plunger 146. The plunger 146 is slidably mounted in the casing 30 with one end thereof projecting out of the casing and carrying a push button 148.

The plunger 146 is biased away from bell crank lever 142 by a spring 150 acting between the casing 30 and a collar 152 formed on the plunger 146. The collar 152 is engageable with the wall in the casing 30 to form a limit stop and prevent ejection of the plunger 146 from the casing.

The spring 150 normally holds the plunger 146 out of engagement with the bell crank lever 142 so that the contacts 120, 122, 128, 130 will operate solely under control of the cam 138 and push rod 140. However, when the plunger 146 is moved downward against the bias of the spring 150 by manipulation of the push button 148, the inner end of the plunger 146 engages the seating surface 144 on the bell crank lever 142, pivoting the bell crank lever 142 and imparting counterclockwise movement to the switch arm 132. This movement of the switch arm 132 moves the contact 130 out of engagement with the contact 128 and disconnects the heating element 116 from the line wire L1.

To maintain the heating element 116 in its inoperative condition, latching means is provided for holding the plunger 146 in its depressed position to maintain the contacts 128, 130 out of engagement with each other. To this end, a hook latch 154 is pivoted on the casing 30 adjacent the push button 148. The hook latch 154 is adapted to be hooked over the top of the push button 148 when the same is depressed to retain it in its depressed position until the hook latch 154 is manually released.

In operation, rotation of the dial 34 to move the cam 138 out of engagement with the push rod 140 would permit the switch arms 124, 132 to move in a clockwise direction under the bias of the springs 126, 134 and close contacts 120, 122, 128, 130. The heating element 116 is then connected between wire 84 and line wire L1 through a circuit which may be traced as follows: line wire L1, switch arm 132, contacts 130, 128, wire 156, and heating element 116 to wire 84.

The heating element 118 is connected between line wire L1 and wire 84 through a circuit which may be traced as follows: line wire L1, switch arm 124, contacts 122, 120, wire 158, heating element 118, and wire 190 to wire 84.

It will be apparent from the foregoing that the operation of the apparatus of Fig. 4 is similar to that of Fig. 1 differing only in that portions of the surface heater may be manually selected for use in the heating operation.

While four embodiments of the invention have been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:
1. A thermostatic control device comprising a casing, a pair of fixed contacts mounted on said casing in spaced superposed relation, a pair of movable contacts mounted in said casing in spaced superposed relation and being cooperable with said fixed contacts respectively for controlling a heating circuit, means for biasing said movable contacts into engagement with said fixed contacts, thermally responsive means including an expansible element mounted on said casing and being operatively engageable with one of said movable contacts for moving the same out of engagement with one of said fixed contacts upon a predetermined expansion of said element, and abutment means threadedly mounted on the other of said movable contacts to extend laterally toward said one movable contact and being operatively engageable by said one movable contact for moving said other movable contact out of engagement with the other of said fixed contacts upon a further expansion of said element.

2. A thermostatic control device comprising a casing, a pair of fixed contacts mounted on said casing in spaced superposed relation, a pair of movable switch arms mounted in said casing in spaced superposed relation, each of said switch arms having a contact movable therewith and being biased to normally hold said movable contacts in engagement with said fixed contacts respectively, thermally responsive means including an expansible element mounted on said casing and being operatively engageable with one of said switch arms upon expansion thereof for moving said one switch arm from its biased position, and an adjustable abutment means mounted on the other of said switch arms between said switch arms for establishing an operative connection therebetween and moving the other of said switch arms from its biased position upon further expansion of said element.

3. A control device as claimed in claim 2 wherein said abutment means comprises a member threadedly carried on said other switch arm and extending toward said one switch arm, said member being adjustable laterally of said one switch arm to vary the degree of said further expansion required to actuate said second switch arm.

4. A thermostatic control device comprising a casing, a pair of fixed contacts mounted on said casing in spaced superposed relation, a pair of movable contacts mounted in said casing in spaced superposed relation and being engageable with said fixed contacts respectively, temperature responsive means including a movable element in said casing operatively connected to one of said movable contacts for actuating the same, adjustable abutment means mounted on said one movable contact and extending laterally thereof for actuating the other of said movable contacts, a second pair of fixed contacts mounted in said casing, a second pair of movable contacts mounted in said casing and being engageable with said second pair of fixed contacts respectively, adjusting means for said temperature responsive means, means operatively associated with said adjusting means for actuating said second pair of movable contacts, and manually operable means for actuating one of said second pair of movable contacts.

5. A thermostatic control device as claimed in claim 4 wherein said manually operable means comprises an axially movable plunger extending from said casing, and a latch member is provided for latching said plunger in one position thereof.

6. A thermostatic control device for a parallel circuit having a source of electric energy comprising a casing, switch means mounted in said casing and having open and closed positions for controlling energization of the parallel circuit, thermally responsive means including an expansible element mounted on said casing and being operatively associated with said switch means for actuating the same between said positions, adjustment means for said temperature responsive means including a rotatable member mounted on said casing in spaced superposed relation, a plurality of fixed contacts mounted in said casing, a plurality of movable contacts mounted in said casing in spaced superposed relation and cooperable with said fixed contacts to connect portions of the parallel circuit to the source respectively, cam means associated with said rotatable member, and an operative connection between said cam means and said movable contacts for actuating the same to an open position upon rotation of said rotatable member to a predetermined position, said operative connection including an adjustable abutment means mounted on one of said movable contacts and engageable with the other of said movable contacts.

7. A thermostatic control device as claimed in claim 6 wherein manually operable means are provided for actuating at least one of said movable contacts independently to selectively energize at least one portion of the parallel circuit.

References Cited in the file of this patent

UNITED STATES PATENTS

| | | |
|---|---|---|
| 2,385,434 | Weber | Sept. 25, 1945 |
| 2,403,824 | Newell | July 9, 1946 |
| 2,441,192 | Graves | May 11, 1948 |
| 2,591,803 | Garner | Apr. 8, 1952 |
| 2,671,136 | Greenawalt | Mar. 2, 1954 |
| 2,715,664 | Garner et al. | Aug. 16, 1955 |
| 2,718,574 | Weber et al. | Sept. 20, 1955 |